(12) United States Patent
Matsuzawa et al.

(10) Patent No.: US 7,559,025 B2
(45) Date of Patent: Jul. 7, 2009

(54) DISPLAY CONTROL PROGRAM, TERMINAL APPARATUS, AND DISPLAY CONTROL METHOD

(75) Inventors: Takeshi Matsuzawa, Kanagawa (JP); Kazuhiro Kondo, Tokyo (JP)

(73) Assignees: Sony Ericsson Mobile Communications Japan, Inc., Tokyo (JP); Sony Corporation, Tokyo (JP)

( * ) Notice: Subject to any disclaimer, the term of this patent is extended or adjusted under 35 U.S.C. 154(b) by 939 days.

(21) Appl. No.: 11/169,675

(22) Filed: Jun. 30, 2005

(65) Prior Publication Data

US 2006/0010380 A1    Jan. 12, 2006

(30) Foreign Application Priority Data

Jul. 9, 2004    (JP)    ............................. 2004-203077

(51) Int. Cl.
 *G06F 3/00*    (2006.01)
 *G06F 3/048*    (2006.01)
 *G06F 13/00*    (2006.01)
 *G06F 13/28*    (2006.01)

(52) U.S. Cl. ................... 715/700; 715/772; 715/977; 711/100

(58) Field of Classification Search .............. 715/772, 715/977; 711/100
 See application file for complete search history.

(56) References Cited

U.S. PATENT DOCUMENTS 6,661,454 B1 * 12/2003 Hwang et al. ............ 348/231.1

FOREIGN PATENT DOCUMENTS

| EP | 1385096 A2 * | 1/2004 |
| JP | 2002-51382 | 2/2002 |
| WO | WO 2080176 A2 * | 10/2002 |

OTHER PUBLICATIONS

Brian Mason "Memory Mapper 1.5" Washington Apple Pi Journal, Mar./Apr. 2001, 6 pages.*

* cited by examiner

*Primary Examiner*—Doug Hutton
*Assistant Examiner*—Andrea N Long
(74) *Attorney, Agent, or Firm*—Oblon, Spivak, McClelland, Maier & Neustadt, P.C.

(57) ABSTRACT

A display control program is proposed which displays data already stored in a memory on a display unit if an empty capacity of the memory is insufficient for an amount of write data to be written in the memory; displays an operator on the display unit in a first color, the operator being capable of moving by a user operation and being used for selecting data to be overwritten with the write data from the data displayed on the display unit; displays a gage on the display unit and display in a second color a range in the gage corresponding to an insufficient capacity for writing the write data in the memory; and displays a range in the gage corresponding to an empty capacity to be formed by deleting the data selected with the operator, in the first color same as a color of the operator.

6 Claims, 8 Drawing Sheets

DISPLAY CONTROL PROGRAM, TERMINAL APPARATUS, AND DISPLAY CONTROL METHOD

BACKGROUND OF THE INVENTION

1. Field of the Invention

The present invention relates to a display control program suitable for use with an apparatus having a memory such as a mobile phone, a personal handyphone system (PHS) phone, a personal digital assistant (PDA) and a personal computer. More particularly, the present invention relates to a display control program, a terminal apparatus and a display control method capable of intuitively and easily selecting data to be deleted from data stored in a memory, when an empty capacity of the memory is insufficient for the amount of write data to be written in the memory.

2. Description of Related Art

Japanese Patent Application Publication No. 2002-51382, p. 4, FIG. 3 discloses "Mobile Communication Terminal" which can adjust the capacity of files to be attached (the number of files to be attached) to an e-mail so as to set the total transmission capacity of the e-mail within a predetermined transmission allowable capacity.

In this mobile communication terminal, when files are to be attached, a gage indicating a transmission available capacity together with a list of attachable files is displayed on an LCD display unit. This gage displays a range indicating an empty capacity usable for attaching files, in a first display color, and a range indicating an area used by attached files, in a second display color.

As a user selects a desired file from a file list, a circle symbol "O" indicating a selection of the file is displayed at the side of the selected file name. If a file to be attached is not selected, almost all the range of the gage is displayed in the first display color. As a file to be attached is selected, the range corresponding to the capacity of the selected file is displayed in the second display color.

As files are selected in this manner repetitively, the range in the gage displayed in the second display color is gradually elongated in correspondence with the capacity of the selected files. A user selects files to be attached, by visually recognizing the capacity of each file to be attached, so as to make the range in the gage displayed in the second display color fall within the whole length of the gage. In this manner, it becomes possible to adjust the total transmission capacity of an e-mail including the capacity of attached files so that it falls within the transmission available capacity.

There is the case that the capacity of files selected and attached exceeds the transmission available capacity. In this case, the mobile communication terminal displays the whole range in the gage in a color representing in excess of the transmission available capacity to thereby inform the user of a necessity of attachment cancellation.

Apart from the above, when a user designates to delete attached files, the list of files selected to attach to an e-mail is displayed on the LCD display unit. The whole range in the gage is displayed in the second display color indicating the use area.

As the user selects the attached file to be deleted from the list, a "x" symbol indicating a designation of attachment cancellation of the file is displayed at the side of the file name to which attachment cancellation was designated. The range in the gage corresponding to the capacity of the file to which attachment cancellation was designated is displayed in the first display color representing the empty capacity.

As an operation of attachment cancellation of files is performed repetitively, the range in the gage displayed in the first display color is gradually elongated in correspondence with the capacity of selected files. A user selects files to be deleted, by visually recognizing the capacity of each file whose attachment is cancelled, so as to make the range in the gage displayed in the first display color fall within the whole length of the gage. In this manner, it becomes possible to adjust the total transmission capacity of an e-mail including the capacity of attached files so that it falls within the transmission available capacity.

However, the mobile communication terminal disclosed in Japanese Patent Application Publication No. 2002-51382 displays the range in the gage corresponding to the empty area in the first display color, and the range corresponding to the capacity of files designated for attachment cancellation also in the first display color. Namely, both the ranges are displayed in the same first display color. It is therefore difficult to distinguish between the initially existing empty area and an empty area formed by cancelling attachment of a file.

Similarly, in order to form an arbitrary empty area in the transmission available capacity and memory, the empty area is formed by checking a combination of files whose attachment is cancelled or deleted. However, if there are a plurality of files designated to cancel or delete attachment, empty areas to be formed through attachment cancellation or deletion of a plurality of files are displayed in one color, the first display color, so that it is difficult to check the combination.

In the mobile communication terminal disclosed in Japanese Patent Application Publication No. 2002-51382, a cursor (mesh) is moved to the file name whose attachment is cancelled, in the list of file names. When the file whose attachment is cancelled is selected, the range in the gage corresponding to the capacity of the selected file is displayed in the first display color. However, the selected file is displayed by using the "mesh" and the empty capacity to be formed through attachment cancellation of the selected file is displayed in "color (=first display color)". It is therefore difficult for a user to intuitively distinguish between the selected file and the empty area to be formed through attachment cancellation of the selected file. Namely, the relation between two displaying methods "displaying with mesh" and "displaying in color" is weak. It is therefore difficult for a user to intuitively distinguish between the selected file and the empty area to be formed through attachment cancellation of the selected file.

In cancelling attachment of files, there may exist files inhibited to cancel attachment. Similarly, in deleting desired files stored in a memory, there may exist files inhibited to delete from the memory. If attachment cancellation or and deletion of these files is erroneously designated, it is preferable for a system side to reject the designation of attachment cancellation or deletion of these files or to confirm the designation by the user.

SUMMARY OF THE INVENTION

According to an embodiment of the present invention, there is provided a display control program, a terminal apparatus and a display control method which:

display data already stored in a memory on a display unit if an empty capacity of the memory is insufficient for an amount of write data to be written in the memory;

display an operator on the display unit in a first color, the operator being capable of moving by a user operation and being used for selecting data to be overwritten with the write data from the data displayed on the display unit;

display a gage on the display unit and display in a second color a range in the gage corresponding to an insufficient capacity for writing the write data in the memory; and display a range in the gage corresponding to an empty capacity to be formed by deleting the data selected with the operator, in the first color same as a color of the operator.

According to the present invention, the range in the gage corresponding to the insufficient capacity for writing the write data in the memory is displayed in the second color, and the range in the gage corresponding to the empty capacity to be formed by deleting the data selected with the operator is displayed in the first color same as the color of the operator. A user can therefore recognize clearly each capacity.

The operator for selecting data of a deletion candidate and the range in the gage corresponding to the empty capacity to be obtained by deleting the data selected with the operator are displayed in the first color same as the color of the operator. A user can therefore recognize intuitively the relation therebetween.

The present invention is applicable to a mobile phone.

Further features of the invention, and the advantages offered thereby, are explained in detail hereinafter, in reference to specific embodiments of the invention illustrated in the accompanying drawings.

DESCRIPTION OF THE PREFERRED EMBODIMENTS

[Circuit Structure of Portable Phone]

Figure 1:
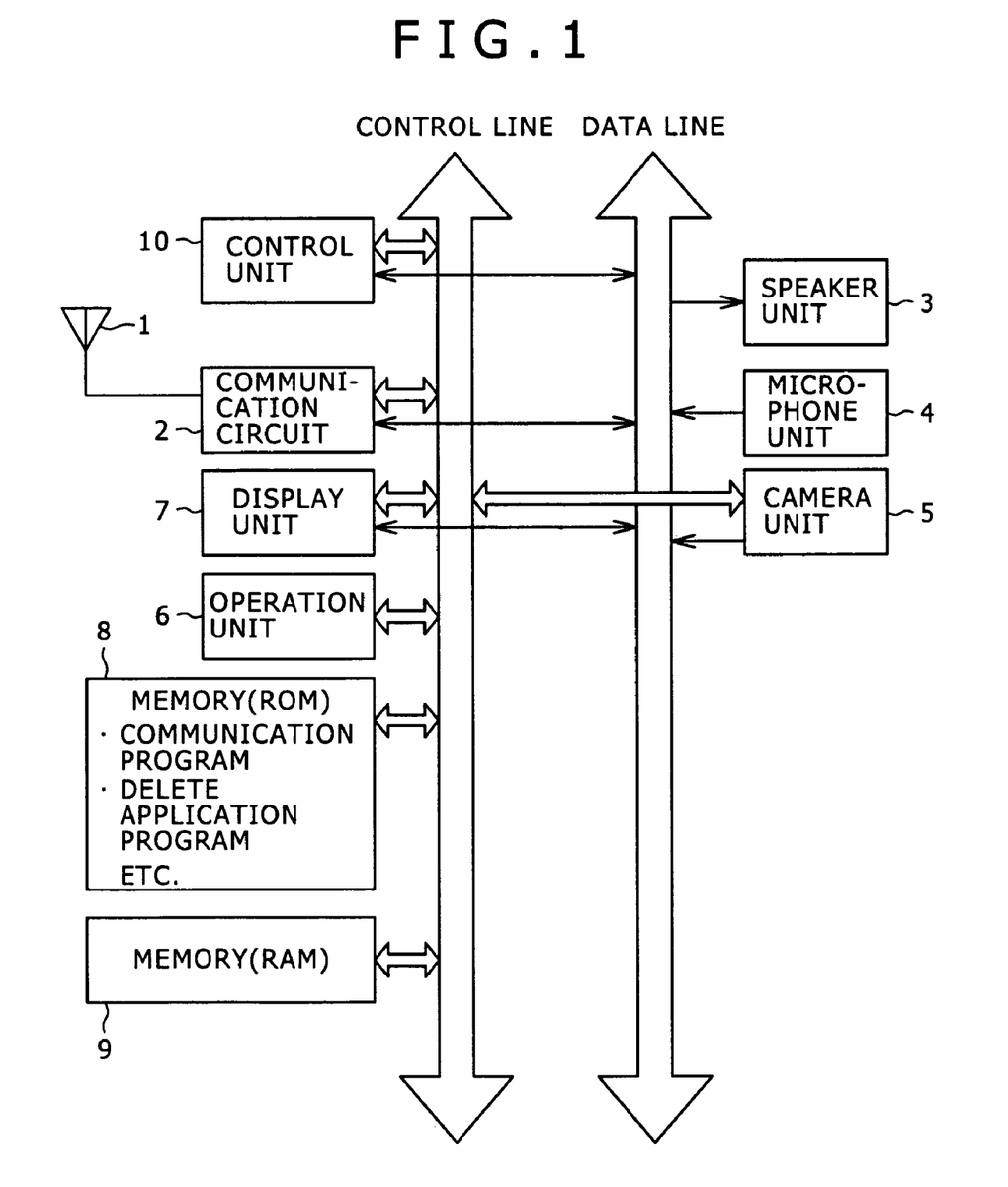
FIG. 1 is a block diagram of a mobile phone according to an embodiment of the present invention.

A mobile phone according to an embodiment of the present invention has, as shown in FIG. 1, an antenna 1 and a communication circuit 2 for data transmission to and from a base station, a speaker unit 3 for outputting voices such as incoming phone voices, voices of a moving image file and voices of music data, a microphone unit 4 for collecting voices such as outgoing phone voices, a camera unit 5 for imaging a desired object and an operation unit 6 having a plurality of keys for input operations.

The mobile phone has also a display unit 7 for displaying standby images and texts of mobile mails as well as file names, a gage and the like to be used with a delete application program and the like to be described later, a memory (ROM) 8 storing various application programs such as the delete application program to be described later, a memory (RAM) 9 for storing standby images, music data, test data of transmitted/received mobile mails, and a control unit 10 for controlling the whole operation of the mobile phone.

[External Appearance of Portable Phone]

Figure 2:
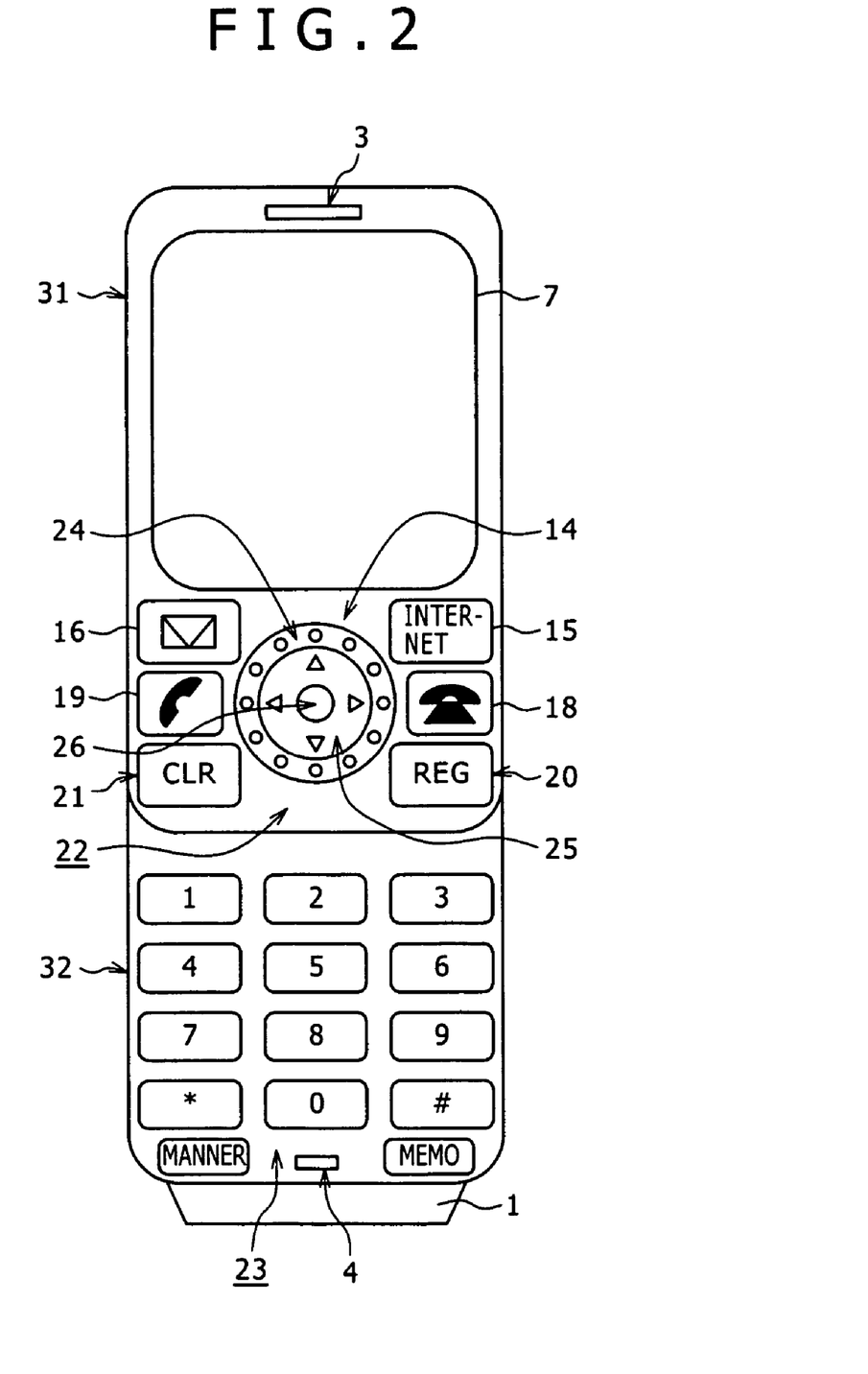
FIG. 2 is a diagram showing an external appearance of the mobile phone of the embodiment.

FIG. 2 shows an external appearance of the mobile phone. In the mobile phone, one end portions of upper and lower housings 31 and 32 are mutually coupled via a rotary shaft mounted generally perpendicular to a display screen of the display unit, and the upper housing 31 or lower housing 32 can be rotated in a clockwise direction or counter-clockwise direction around a rotation direction of the rotary shaft.

The upper housing 31 has, in addition to the display unit 7, an upper operation unit 22 including a rotation operation unit 14, a right key 15, a left key 16, an on-hook key 19, a user select key 20 and a clear key 21. The lower housing 32 has a lower operation unit 23 including numerical keys, an * key, a # key and the like, and the antenna 1 mounted along a lower edge portion of the lower housing. The camera unit 5 is mounted on the back side of the mobile phone.

The rotation operation unit 14 has a ring-shaped rotation operation dial 24 capable of being rotated in the clockwise direction and counter-clockwise direction, a cross key 25 disposed along the inner periphery of the rotation operation dial 24 and being able to be depressed at least up, down, right and left positions thereof, and a decision key (enter key) 26 mounted along a center axis of the rotation operation unit 14 and being able to be depressed.

[Delete Application Program]

In this mobile phone, the control unit 10 operates in accordance with the delete application program described in the following, when data, such as data downloaded via a network, data input from the operation unit 6, image data (still image data or moving image data) taken with the camera unit 5, is stored in the memory 9 (or memory 8). Flow charts in FIGS. 3 to 5 show a sequence of operations to be executed by the control unit 10 on the basis of the delete application program.

Figure 3:
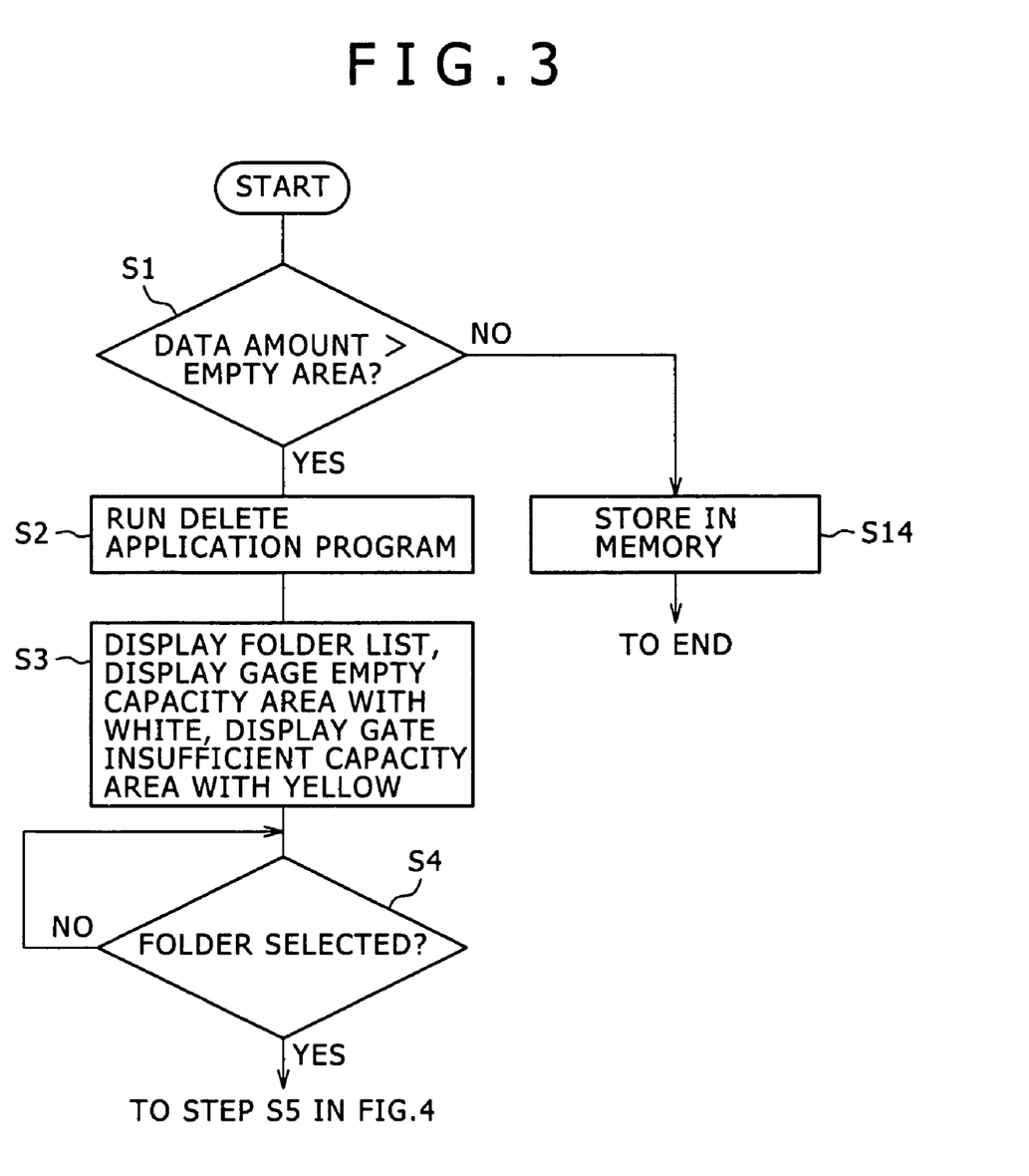
FIG. 3 is a flow chart illustrating an operation flow at an front stage in a sequence of operations of the embodiment mobile phone on the basis of a delete application program.

The flow chart shown in FIG. 3 starts at the timing when an event of writing data in the memory 9 occurs, and the control unit 10 starts a process from Step S1. At Step S1 the control unit 10 compares an amount of write data with a capacity (empty capacity) of an empty area in the memory 9 (or memory 8) at a write data destination, to judge whether or not the amount of write data is larger than the empty capacity of the memory 9 (data amount>empty capacity?).

In the mobile phone, a memory at a data write destination can be designated in advance. Namely, the memory (RAM) 9 shown in FIG. 1 collectively shows an inner memory built-in in advance the mobile phone and an external memory to be connected to the mobile phone. A user selects beforehand either the inner memory or the outer memory as a data storage destination. At Step S1 the control unit 10 detects the empty capacity of the memory set beforehand by a user.

Figure 4:
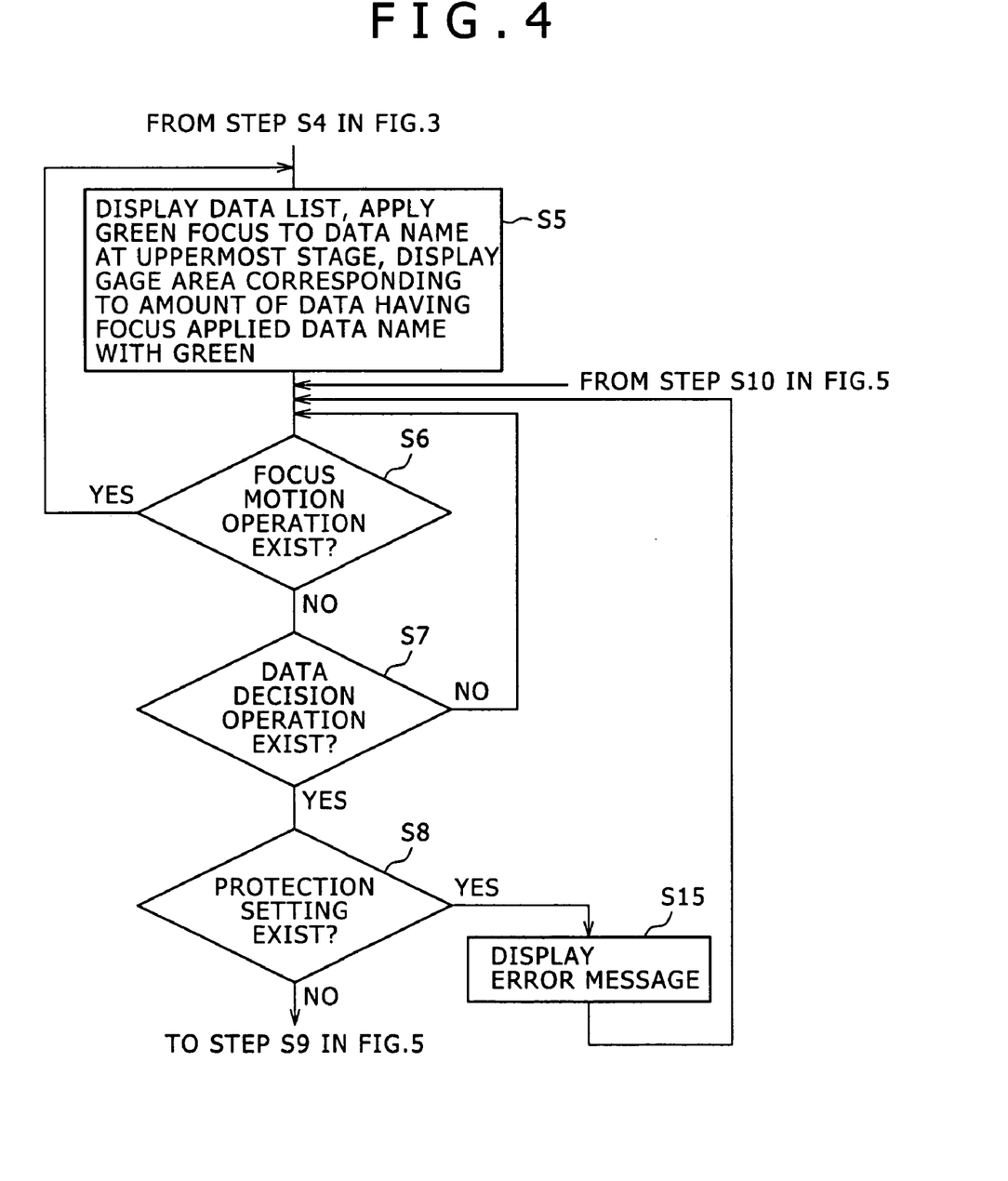
FIG. 4 is a flow chart illustrating an operation flow at a middle stage in a sequence of operations of the embodiment mobile phone on the basis of the delete application program.
Figure 5:
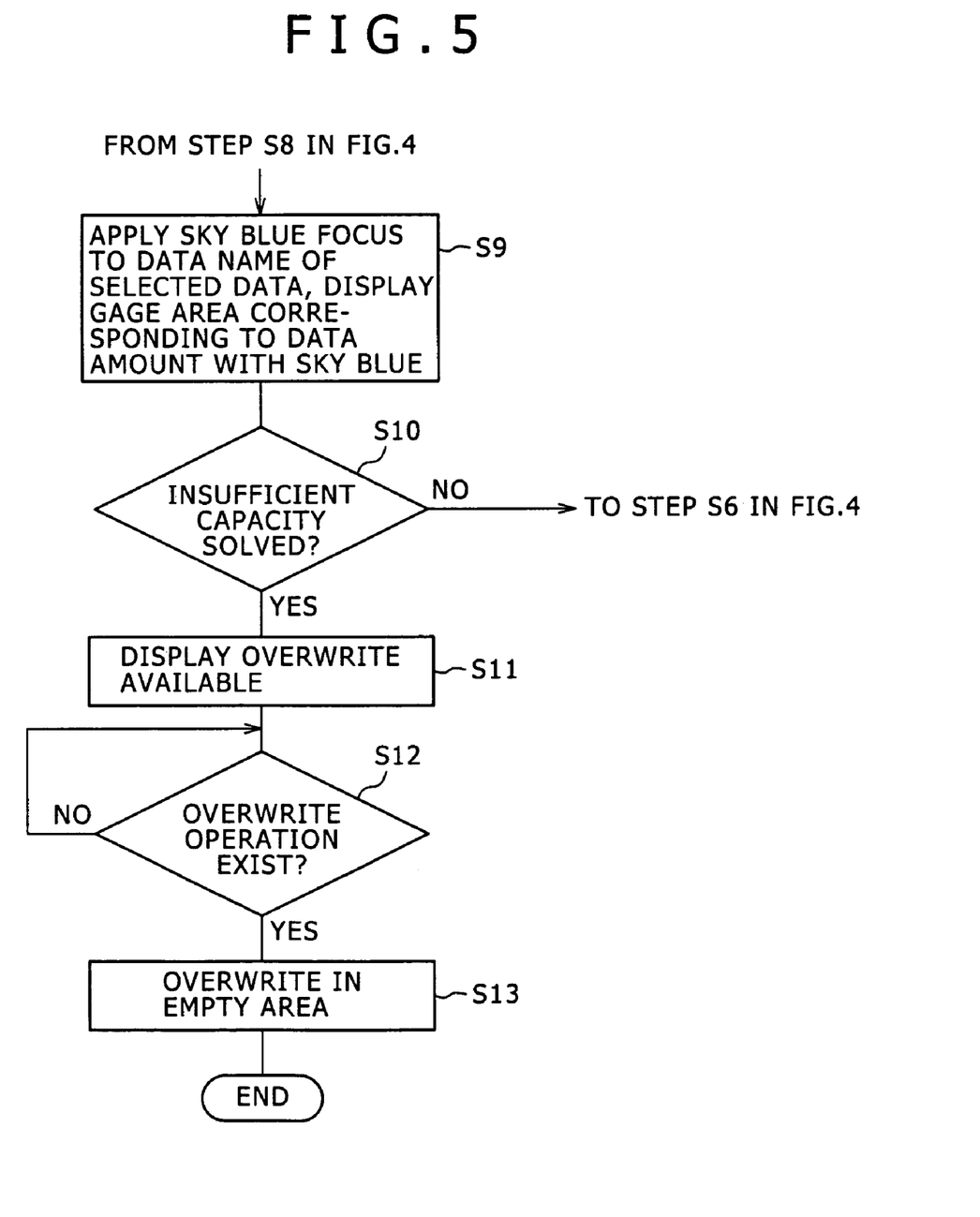
FIG. 5 is a flow chart illustrating a operation flow at a back stage in a sequence of operations of the embodiment mobile phone on the basis of the delete application program.

If the control unit 10 judges at Step S1 that the empty capacity of the memory 9 is larger than the amount of write data, the flow advances to Step S14 whereat the write data is stored in the memory 9 to thereafter terminate the processes of the flow charts shown in FIGS. 3 to 5.

On the contrary, if the control unit 10 judges at Step S1 that the empty capacity of the memory 9 is smaller than the amount of write data, a process is advanced to Step S2.

As described above, a memory to be written with data is designated beforehand by a user. Therefore, if it is judged that the empty capacity of the memory 9 is smaller than the amount of write data, the control unit 10 may execute the following steps: a step of controlling the display unit 7 to display a message or the like asking a user whether the memory designated as the write destination is to be changed; a step of, if the user changes the write destination memory in response to the message, returning to Step S1 whereat the empty capacity of the changed memory is detected; a step of, if the empty capacity of the changed memory is equal to or larger than the amount of write data, advancing to Step S14 whereat data is written in the changed memory. If the empty capacity of the changed memory is smaller than the amount of write data, the control unit 10 advances a process to Step S2 to be described in the following.

Next, at Step S2 the control unit 10 activates the delete application program stored in the memory 8 and advances a process to Step S3. At Step S3, a list of folders stored in the memory 9 and a gage are displayed on the display unit 7. The name of a folder selected for data write from the folder list is focussed and displayed.

Namely, an area of the memory 9 of the mobile phone is divided into a plurality of areas each assigned a folder name such as "an image folder", "a voice folder" and "an application folder", to allow each folder to be selectively written with data. Therefore, at Step S3, a list of names of folders stored in the memory 9 is displayed and the folder name selected for data write from the folder list is focussed and displayed.

The "focussed" means to distinguish the whole display area of the name of a folder for data write and a data name of data to be deleted through overwrite to be described in the following, from other areas, by brightly displaying them, e.g., in "green", i.e., by highlighting them. In the following, this display is expressed by the term "to focus-display". Instead of the focus-display, a cursor such as an underline may be displayed.

Figure 6:
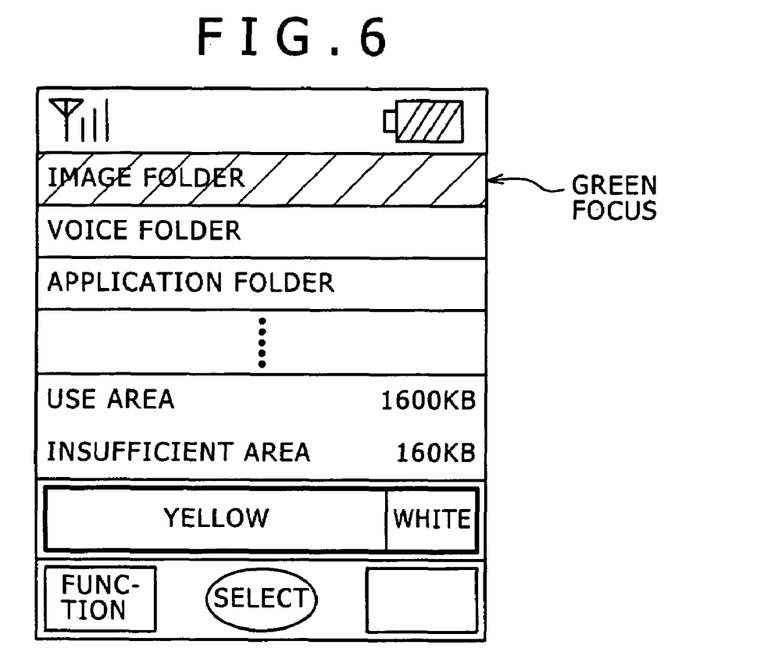
FIG. 6 is a diagram showing an example of a display screen displayed first on a display unit of the mobile phone when the depletion program starts.

FIG. 6 shows an example of a display screen displaying the folder list and the gage. In this example, an "image folder", a "voice folder", an "application folder", . . . are displayed as the folder list, and numerical values are displayed which indicate that 1600 KB in the whole memory area of the memory 9 is presently used by the image folder and that an empty area of 160 KB is necessary for data write. About ⅙ the area of the gage is displayed in "white" indicating the empty area of the memory 9, and about remaining ⅚ the area is displayed in "yellow" indicating an insufficient area for data write. In the folder list, the folder name of the "image folder" at the uppermost stage is focus-displayed in "green".

When the display screen shown in FIG. 6 is displayed, the control unit 10 focus-displays the area corresponding to the folder name displayed at the uppermost stage of the holder list, as a default.

Areas to be focus-displayed can be sequentially moved along the folder names and data names. When an operation of the up-key of the cross key 25 of the upper operation unit 22 shown in FIG. 2 is detected, the control unit 10 moves the area to be focus-displayed to the display area of the folder name one display area up the display area of the folder name presently focus-displayed. When an operation of the down-key of the cross key 25 is detected, the control unit 10 moves the area to be focus-displayed to the display area of the folder name one display area down the display area of the folder name presently focus-displayed.

A user performs the up/down operation of the cross key 25 in this manner to move the area focus-displayed, and depresses the decision key 26 of the rotation operation unit 14 shown in FIG. 2 to designate a desired folder for data write.

At Step S4 in the flow chart shown in FIG. 3, the control unit 10 judges whether the decision key 26 is depressed. If a depression of the decision key 26 is not detected, the control unit moves the area to be focus-displayed in accordance with an up/down operation of the cross key 25. When a depression of the decision key 26 is detected, it means that the folder for data write is selected, and the process is advanced to Step S5 in the flow chart shown in FIG. 4.

At Step S5, a list of names of data stored in the focus-displayed folder when the decision key 26 was depressed and the gage are displayed on the display unit 7. As a default, the data name displayed in the data list at the uppermost stage is focus-displayed in "green", a range in the gage is calculated which corresponds to the empty area to be formed in the memory 9 by deleting the focus-displayed data, and the calculated range is displayed in "green" same as the color of focus-display, at a position adjacent to the display area of the empty area initially existing in the memory 9 and displayed in "white".

Figure 7:
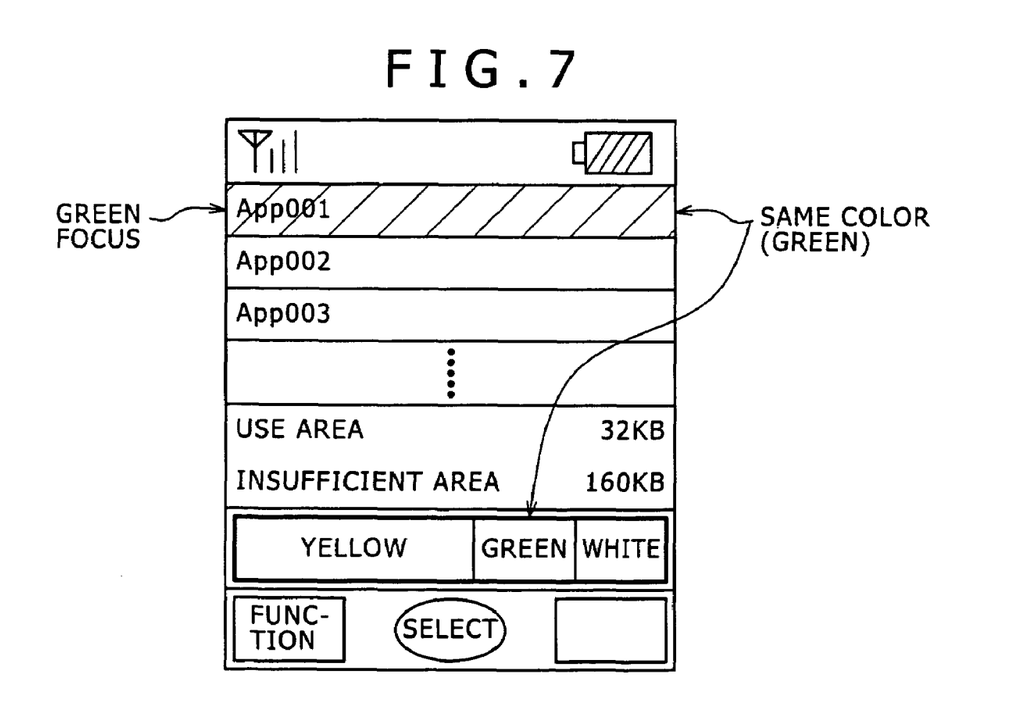
FIG. 7 is a diagram showing an example of a display screen displayed when depletion candidate data is selected.

FIG. 7 shows an example of a display screen showing the data list and the gage. In FIG. 7, "App001 (App: application program)", "App002", "App003", . . . are displayed as the data list, and numerical values are displayed which indicate that 32 KB in the whole memory area of the image folder is presently used by "App001" and that an empty area of 160 KB is necessary for data write. About ⅙ the area of the gage is displayed in "white" indicating the empty area of the memory 9, and about remaining ⅚ the area is displayed in "yellow" indicating an insufficient area for data write. In the folder list shown in FIG. 7, the "App001" displayed at the uppermost stage is focus-displayed in "green".

With this display control, a user can:

1. intuitively recognize the empty area formed by deleting data, because the presently selected data is focus-displayed in "green" and the range in the gage indicating the empty area formed in the memory 9 by deleting the data is displayed in "green"; and 2. distinguish between both empty areas because the range of the empty area initially existing in the memory 9 is displayed in "white" and the range of the empty area formed in the memory 9 be deleting the data is displayed in "green".

As described earlier, the area focus-displayed in "green" can be moved by performing an up/down operation of the cross key 25. A user selects data (=data to be overwritten) to be deleted from the data list by an up/down operation of the cross key 25. At Step S6 shown in FIG. 4, the control unit 10 detects an operation of the cross key 25 to judge whether an area to be focus-displayed is moved. When a shift operation of the area to be focus-displayed is detected, the process returns to Step S5 whereat the area to be focus-displayed is moved in accordance with the operation of the cross key 25.

If a shift operation of the area to be focus-displayed is not detected, the control unit 10 advances a process to Step S7 whereat it is judged whether the decision key 26 of the rotation operation unit 14 is depressed to thereby judge whether deletion data is selected. If a depression of the decision key 26 is not detected, a process returns to Step S6 whereat it is judged whether the area to be focus-displayed is moved, and at the timing when a depression of the decision key 26 is detected, a process is advanced to Step S8.

[Protection of Data with Protection Setting]

In the data stored in the memory 9, data exists which is preferable not to be deleted as viewed from a user side or a mobile phone system side. For the data not preferable to be deleted as viewed from the system side, protection setting inhibiting data deletion is made beforehand on the system side. For the data stored by a user, protection setting is made independently for each data by operating the operation unit 6.

Therefore, if a user selects data to be erased (overwritten) at Step S7, the control unit judges at Step S8 whether protection setting is made for the data selected to be deleted. Specifically, for the data with protection setting, a flag representative of protection setting is set to, for example, header information or the like of the data stored in the memory 9. The control unit 10 checks this flag to judge whether the data has protection setting.

If it is judged at Step S8 that the data has no protection setting, the data is allowed to be erased and the control unit 10 advances a process to Step S9 shown in FIG. 5.

On the other hand, if the data has protection setting, it is not preferable to erase the data. Therefore, at Step S15 the control unit 10 displays on the display unit 7 an error message such as "The selected data has protection setting. Select other data." to thereafter return a process to Step S6. A user looked at this error message again selects data allowed to be erased from the data list.

In this example, if data with protection setting is selected as the data to be erased, the error message is displayed to protect the data. Instead, when the data list (refer to FIG. 7) is displayed, the control unit 10 may judge whether there is protection setting for all data to be displayed, and displays only the data name of data without protection setting on the display unit as the data list.

Alternatively, the control unit 10 may judge where there is protection setting for all data to be displayed, and the data name of data with protection setting may be "displayed at a half luminance" or "focus-displayed in a predetermined color such as red".

Further, if it is judged that data has protection setting, a message for inquiring a user about removing the protection setting may be displayed, such as "Although this data has protection setting, the protection setting is removed?", to thereby make the user select whether the data protection continues or not. In this case, if the user designates a continuous protection of the data, the control unit 10 returns a process to Step S6, whereas if the user designates removing the protection setting, the control unit 10 advances a process to Step S9 in the flow chart of FIG. 5 to be described in the following.

Next, at Step S9 in the flow chart of FIG. 5, the control unit 10 focus-displays the data name of data decided by a user to be deleted in "sky blue", and the range in the gage corresponding to the amount of the data decided by the user to be deleted in the same "sky blue".

Figure 8:
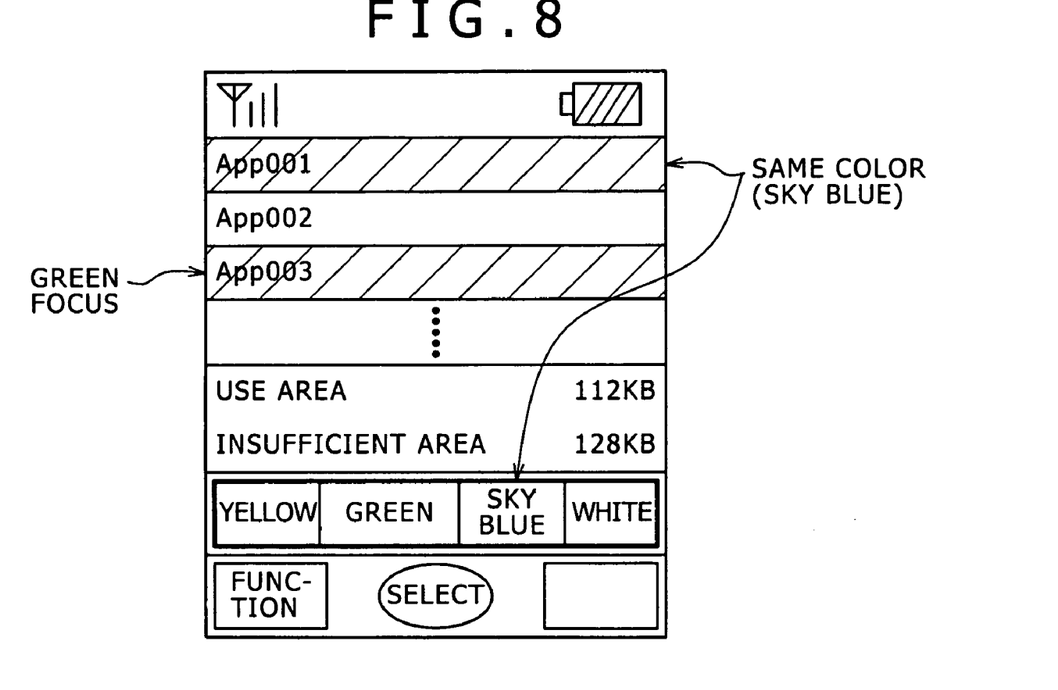
FIG. 8 is a diagram showing an example of a display screen displayed when depletion candidate data is decided to be deleted.

FIG. 8 shows an example of a display screen displaying a data list in which an area corresponding to the data name of data decided by a user to be deleted, is focus-displayed in sky blue and a gage having a corresponding data range is displayed in sky blue. In the example shown in FIG. 8, an area in the data list corresponding to the data name "App001" of data decided by a user to be deleted, is focus-displayed in "sky blue" and a gage having a corresponding data range displayed in "sky blue".

Namely, in the mobile phone:

1. the color of focus-display for selecting data to be deleted is set to "green", data to be focus-displayed in "green" is moved in accordance with a rotation operation of the rotation operation dial 24 of the rotation operation unit 14;

2. the range in the gage corresponding to the amount of data focus-displayed in "green" is displayed in "green" same as the "green" of focus-display; and 3. when a depression operation of the decision key 26 is detected, an area corresponding to the data name of data focus-displayed in "green" is changed to focus-display in "sky blue", and the range in the gage displayed in "green" is displayed in "sky blue" same as the "sky blue" of focus-display.

Therefore, the range in the gage corresponding to the initially existing empty area is displayed in "white", the range corresponding to the data decided to be deleted is displayed in "sky blue" adjacent to the "white" range, the range corresponding to the presently selected data is displayed in "green" adjacent to the "sky blue" range, and the remaining range is displayed in "yellow" indicating an insufficient area.

The same color is used for the "focus-display color" and the "color displayed in the gage" in the manner described above, such as "green" for data selection and "sky blue" for data selection decision. Therefore, a user can intuitively distinguish between the "selected data and an empty data formed by deleting the selected data" and "data decided to be deleted and an empty area formed by deciding to delete the data".

Next, as a user performs a decision operation for deleting data (a depression operation of the decision key 26), at Step S10 the control unit 10 judges whether an empty area for write data is guaranteed (whether an insufficient area is settled), by deleting the data decided by the user to be deleted. If the insufficient area is settled, a process is advanced to Step S11, whereas if the insufficient area is not settled, a process returns to Step S6.

If the insufficient area is not settled, a user rotates the rotation operation dial 24 of the rotation operation unit 14 in the manner described above to move the green focus-display and select desired data, and depresses the decision key 26 to decide to delete the selected data.

Figure 9:
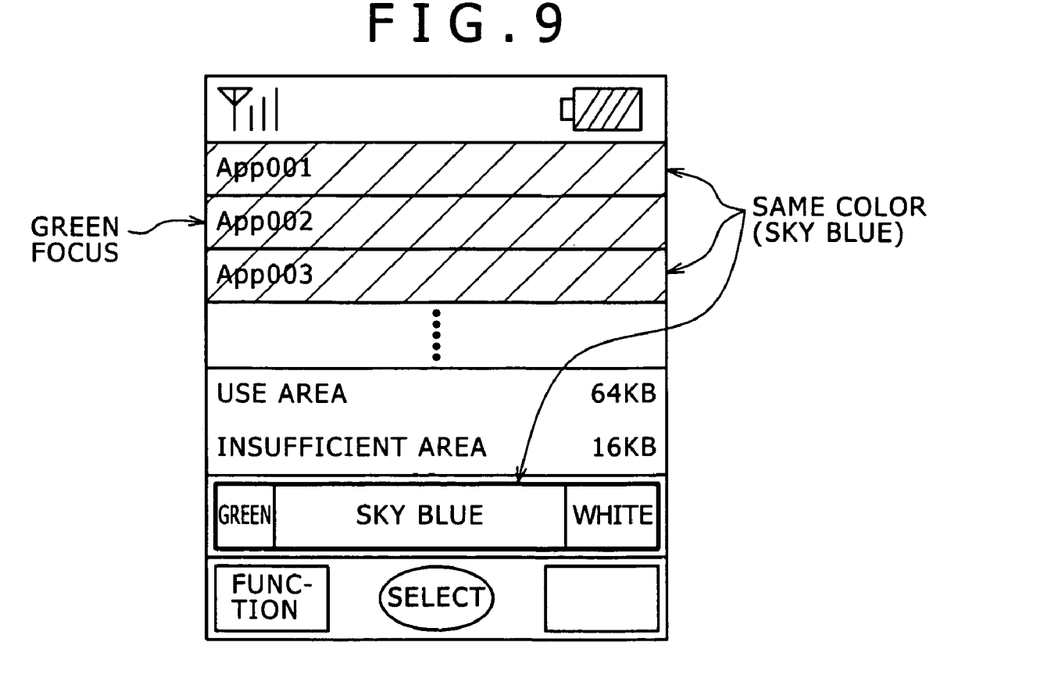
FIG. 9 is a diagram showing an example of a display screen displayed when depletion candidate data is repetitively decided to be deleted.
Figure 10:
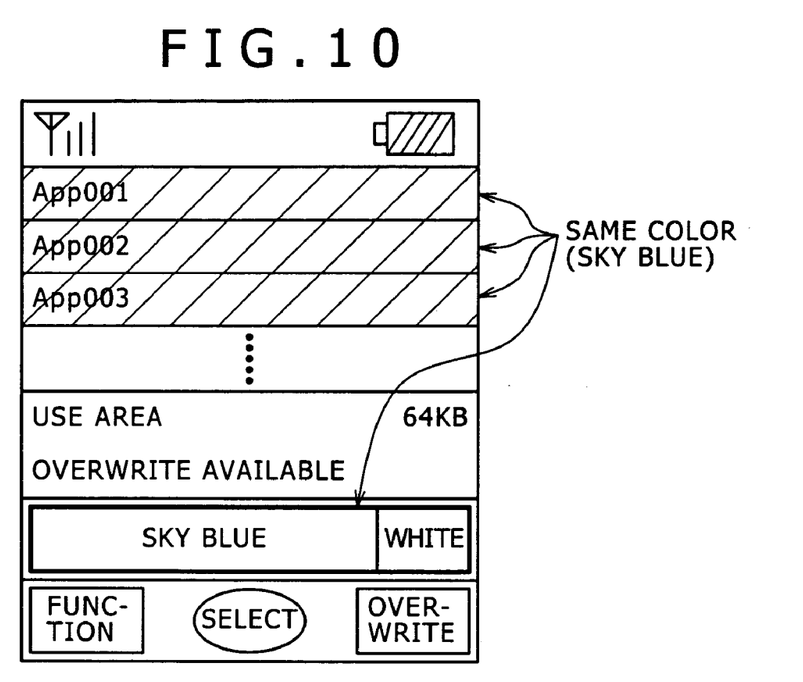
FIG. 10 is a diagram showing an example of a display screen displayed when an empty area corresponding to the amount of new write data is guaranteed by repetitively deciding to delete deletion candidate data.

By repeating the selection and decision operations, the data to be deleted is sequentially decided and as shown in FIG. 9, and the range in the gage displayed in "sky blue" is gradually elongated. When a "total capacity" of the empty area initially existing in the memory 9 (the empty area displayed as the white range in the gage) and the empty area formed by deleting data (the empty area displayed as the sky blue range in the gage) becomes equal to or larger than the amount of write data, the control unit 10 advances a process to Step S11 whereat as shown in FIG. 10, the control unit displays a message to the effect that data write is possible such as "overwrite available", on the display unit 7. A user can therefore recognize that an empty area corresponding to the amount of write data is formed in the memory 9 after some data is delated.

In addition to the message, a word "overwrite" is displayed in near a lower right area of the display unit 7, as shown in FIG. 10. This means that as the right key 15 shown in FIG. 15 is depressed, data overwrite starts. Therefore, at Step S12 in the flow chart of FIG. 5, the control unit 10 judges whether there is a depression operation of the right key 15, to thereby judge whether data overwrite is designated. At the timing when a depression operation of the right key 15 is detected, a process is advanced to Step S13 whereat the data is written in the newly formed empty area of the memory 9 to thereafter terminate a series of processes shown in the flow charts of FIGS. 3 to 5.

The control unit 10 does not delete immediately the selected and decided data from the memory 9, but recognizes the area of the memory 9 storing the selected and decided data as a write area, and overwrites the data in this area to thereby delete the previously stored data.

Figure 11:
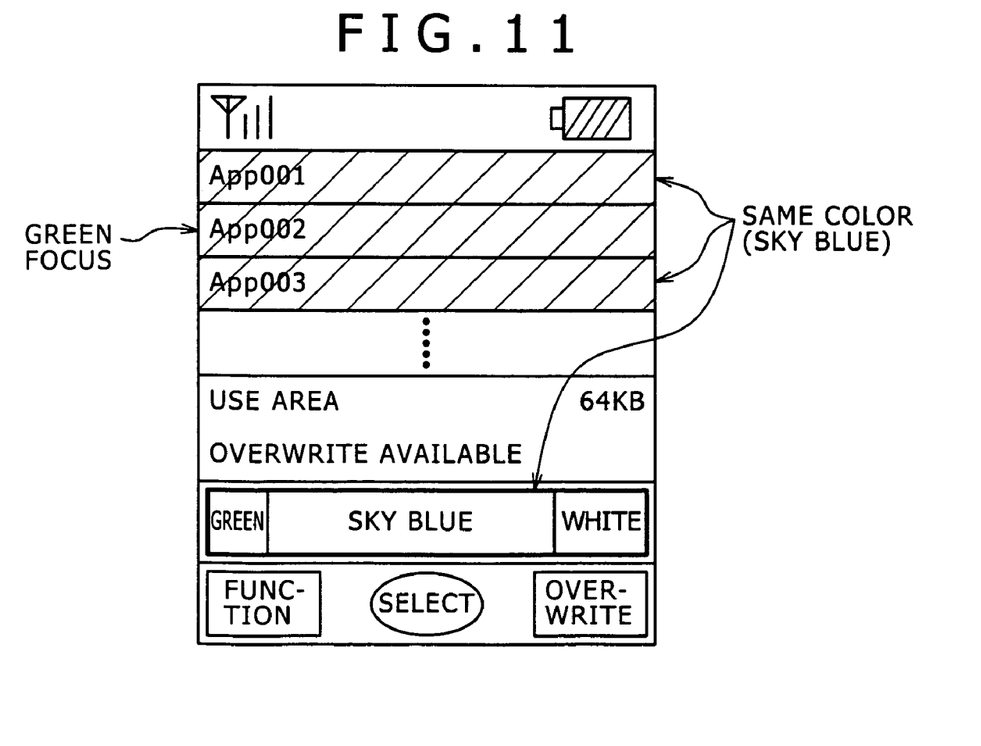
FIG. 11 is a diagram showing an example of a display screen displayed when decision of deleting data is cancelled.

Therefore, even if data is once selected and decided to be deleted, this deletion decision can be cancelled. In this case, a user moves the green focus-display to the display position of the area corresponding to the data name focus-displayed in sky blue. As the green focus-display is moved to the display position of the area corresponding to the data name focus-displayed in sky blue, as shown in FIG. 11 the control unit 10 displays a word "release" in near a lower center area of the display unit 7. This means that as the decision key 26 is depressed, data presently focus-displayed in green is cancelled from deletion. Therefore, the user moves the green focus-display so that the data to be cancelled from deletion is focus-displayed in green, among the data presently focus-displayed in sky blue, and thereafter depresses the decision key 26.

As the decision key 26 is depressed, the control unit 10 sets again the storage area, set as an overwrite area, of the data decided to be deleted, to an non-overwrite area. In response to the user selection and decision operations, the storage area as the overwrite area is set again to the data non-overwrite area.

As apparent from the above description, the mobile phone of the embodiment displays in the gage:

1. the range of the initially existing empty area in "white";

2. the range corresponding to an empty area (insufficient area) necessary for data overwrite in "yellow";

3. the range corresponding to the amount of data selected as an overwrite candidate in "green"; and 4. the range corresponding to the amount of data decided as an overwrite candidate in "sky blue".

A user can therefore recognize clearly and distinguishably the "initially existing empty area (white)", the "empty area (yellow) necessary for data overwrite", the "empty area (green) formed by deleting selected data" and the "empty area (sky blue) formed by deleting data". It is therefore possible to guarantee an empty area while a combination of data to be deleted is studied.

Further, a user can intuitively recognize the "selected data and the empty area formed by deleting the data" and the "data decided to be deleted and the empty area formed after deletion decision", by using the same color for "the focus-display color" and "the color displayed in the gage" such as "green" for selecting data to be deleted and "sky blue" for deciding the selected data.

Furthermore, if data with protection setting is decided as a deletion candidate, a message (which may be a beep sound or the like) to the effect that the data has protection setting is displayed for a user. It is therefore possible to prevent new data is overwritten on the data with protection setting.

In the description of the embodiment, although the present invention is applied to a mobile phone, the present invention is also applicable to all types of terminal apparatuses such as a personal handyphone system (PHS), a personal digital assistant (PDA), a note type personal computer and a desk-top type personal computer.

Although a stripe type gage is used, it may be any arbitrary display shape such as a ring shape and a spiral shape.

The present invention contains subject mater related to Japanese Patent Application No. 2004-203077 filed in the Japanese Patent Office on Jul. 9, 2004, the entire contents of which being incorporated herein by reference.

Lastly, the above-described embodiment is disclosed only as an example of the present invention. It is obvious that in addition to the embodiment, the present invention can be modified in various ways in accordance with designs and the like without departing from the technical concept of the present invention.

What is claimed is:

1. A display control program, embodied on a storage medium for operating a computer, said program comprising:
    data list displaying means for displaying a name list of data already stored in a memory on a display unit when an empty capacity of the memory is insufficient for an amount of write data to be written in the memory;
    operator displaying means for displaying an operator on the display unit in a first color, the operator being capable of moving by a user operation and being used for selecting data to be overwritten with the write data from the name list of the data displayed on the display unit;
    gage displaying means for displaying a gage on the display unit, displaying in a second color a range in the gage corresponding to an insufficient capacity for writing the write data in the memory, and displaying a range in the gage corresponding to an empty capacity to be formed by deleting the data selected with the operator, in the first color same as a color of the operator;
    wherein said gage displaying means displays a range in the gage corresponding to an empty capacity which exits in the memory, in a third color; and
    wherein said gage displaying means changes and displays the operator in a fourth color when the data selected by the operator is decided to be overwritten with the write data, and changes and displays a range in the gage corresponding to an empty capacity to be formed by deleting the data selected with the operator, in the fourth color same as a color of the operator changed and displayed.

2. The display control program according to claim 1, further comprising judging means for judging whether protection setting is made for the data selected to be deleted when the data selected by the operator is decided to be overwritten with the write data;
    wherein said gage displaying means changes and displays the operator and a range in the gage corresponding to an empty capacity to be formed by deleting the data selected with the operator, in the fourth color if it is judged that the data has no protection setting.

3. A terminal apparatus comprising:
    data list displaying means for displaying a name list of data already stored in a memory on a display unit when an empty capacity of the memory is insufficient for an amount of write data to be written in the memory;
    operator displaying means for displaying an operator on the display unit in a first color, the operator being capable of moving by a user operation and being used for selecting data to be overwritten with the write data from the name list of the data displayed on the display unit;
    gage displaying means for displaying a gage on the display unit, displaying in a second color a range in the gage corresponding to an insufficient capacity for writing the write data in the memory, and displaying a range in the gage corresponding to an empty capacity to be formed by deleting the data selected with the operator, in the first color same as a color of the operator;
    wherein said gage displaying means displays a range in the gage corresponding to an empty capacity which exits in the memory, in a third color; and
    wherein said gage displaying means changes and displays the operator in a fourth color when the data selected by the operator is decided to be overwritten with the write data, and changes and displays a range in the gage corresponding to an empty capacity to be formed by deleting the data selected with the operator, in the fourth color same as a color of the operator changed and displayed.

4. The terminal apparatus according to claim 3, further comprising judging means for judging whether protection setting is made for the data selected to be deleted when the data selected by the operator is decided to be overwritten with the write data;

wherein said gage displaying means changes and displays the operator and a range in the gage corresponding to an empty capacity to be formed by deleting the data selected with the operator, in the fourth color if it is judged that the data has no protection setting.

5. A terminal apparatus comprising:

data list displaying means for displaying a name list of data already stored in a storage means on a display unit when an empty capacity of the storage means is insufficient for an amount of write data to be written in the storage means;

operator displaying means for displaying an operator on the display unit in a first color, the operator being capable of moving by a user operation and being used for selecting data to be overwritten with the write data from the name list of the data displayed on the display unit;

gage displaying means for displaying a gage on the display unit, displaying in a second color a range in the gage corresponding to an insufficient capacity for writing the write data in the storage means, and displaying a range in the gage corresponding to an empty capacity to be formed by deleting the data selected with the operator, in the first color same as a color of the operator;

wherein said gage displaying means displays a range in the gage corresponding to an empty capacity which exits in the storage means, in a third color; and wherein said gage displaying means changes and displays the operator in a fourth color when the data selected by the operator is decided to be overwritten with the write data, and changes and displays a range in the gage corresponding to an empty capacity to be formed by deleting the data selected with the operator, in the fourth color same as a color of the operator changed and displayed.

6. A display control method comprising the steps of:

displaying data already stored in memory on a display unit when an empty capacity of the memory is insufficient for an amount of write data to be written in the memory;

displaying an operator on the display unit in a first color, the operator being capable of moving by a user operation and being used for selecting data to be overwritten with the write data from the data displayed on the display unit;

displaying a gage on the display unit and displaying in a second color a range in the gage corresponding to an insufficient capacity for writing the write data in the memory;

displaying a range in the gage corresponding to an empty capacity to be formed by deleting the data selected with the operator, in the first color same as a color of the operator;

wherein a range is displayed in the gage corresponding to an empty capacity which exits in the memory, in a third color; and wherein the gage changes and displays the operator in a fourth color when the data selected by the operator is decided to be overwritten with the write data, and changes and displays a range in the gage corresponding to an empty capacity to be formed by deleting the data selected with the operator, in the fourth color same as a color of the operator changed and displayed.

* * * * *